(No Model.)
F. W. MORSE.
REFRIGERATOR SHIPPING CASE.
No. 556,198.                    Patented Mar. 10, 1896.
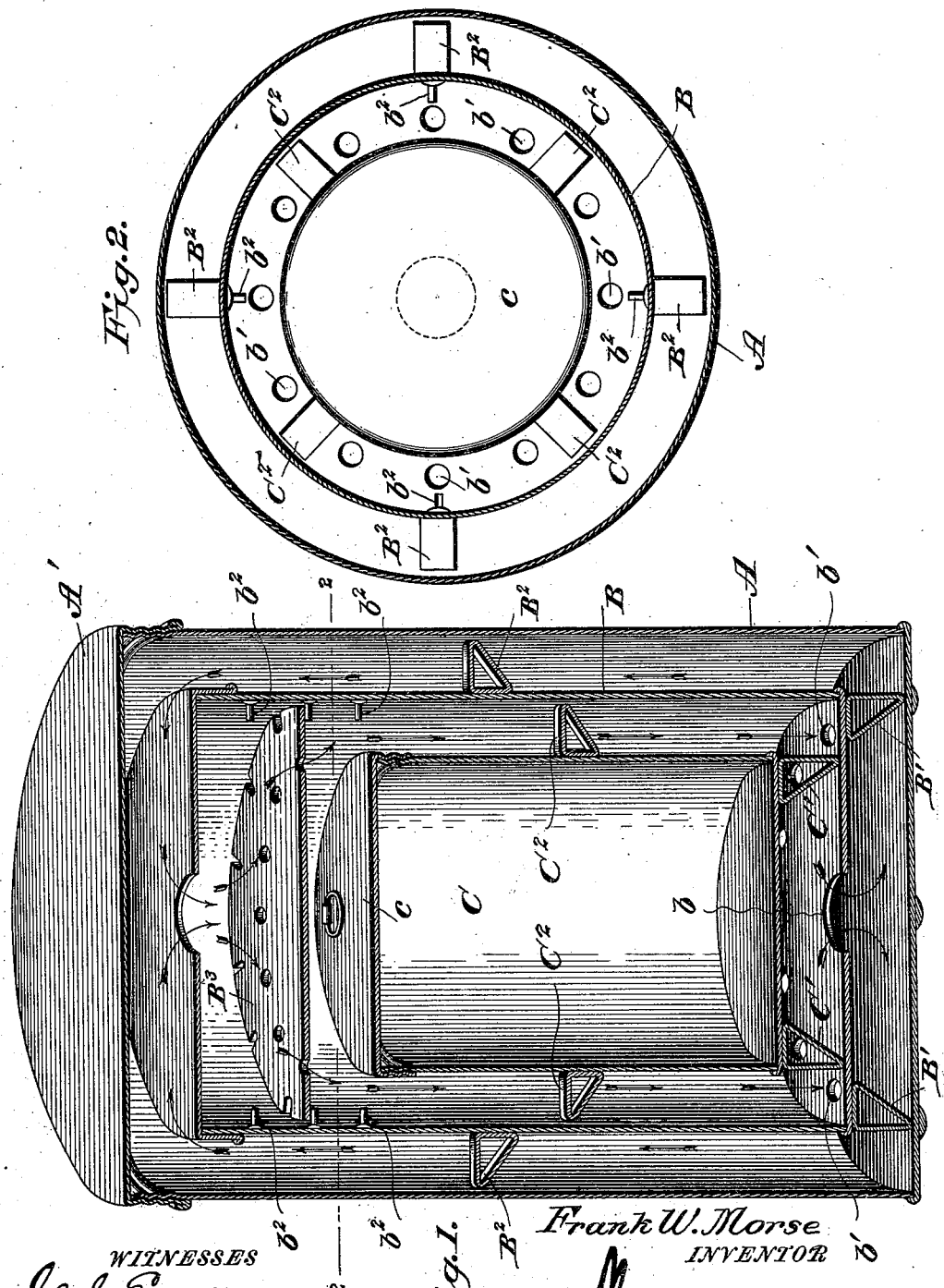
WITNESSES
L. S. Elliott,
T. W. Johnson
Frank W. Morse
INVENTOR
by [signature]
Attorney

UNITED STATES PATENT OFFICE.

FRANK WILTON MORSE, OF ST. JOSEPH, MISSOURI.

REFRIGERATOR SHIPPING-CASE.

SPECIFICATION forming part of Letters Patent No. 556,198, dated March 10, 1896.

Application filed December 5, 1895. Serial No. 571,163. (No model.)

*To all whom it may concern:*

Be it known that I, FRANK WILTON MORSE, a citizen of the United States of America, residing at St. Joseph, in the county of Buchanan and State of Missouri, have invented certain new and useful Improvements in Refrigerator Shipping-Cases; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a shipping-case consisting of a plurality of vessels located one within the other, the inner vessel being adapted to receive perishable goods, and is carried within an intermediate vessel having a space at its upper end for ice and openings in its top and bottom, both inner vessels being provided with feet and lateral projections for supporting the same in proper relative position to present air-spaces between the several vessels, as and for the purpose hereinafter specified.

In the accompanying drawings, forming part of this specification, Figure 1 is a perspective sectional view of a refrigerator shipping-case constructed in accordance with my invention. Fig. 2 is a horizontal sectional view on the line 2 2 of Fig. 1.

A designates the outer vessel, which is preferably cylindrical and provided with a removable top A'. When this outer vessel is constructed of sheet metal its upper end is provided with threads with which the depending threaded flange of the top or cover engages. Within the outer vessel A is placed an intermediate vessel B, which has a removable top provided with a central opening, the bottom being also provided with a central opening $b$ and with marginal perforations $b'$. The vessel B is supported above the bottom of the vessel A by feet B', and is centrally disposed within said vessel by projections $B^2$, the lower sides of which are inclined, as shown, to guide the vessel B into the vessel A. Within the vessel B and near its upper end are several vertical series of inwardly-projecting lugs $b^2$, which support an adjustable perforated shelf $B^3$, said shelf having recesses in its edge so that it may be raised and lowered in the vessel to rest upon any one of the horizontal sets of projecting lugs. The shelf $B^3$ provides an ice-chamber at the upper end of the vessel B, and by adjusting said shelf to different heights the size of the ice-chamber can be increased and diminished.

C designates the interior vessel in which the goods are placed, and this interior vessel is provided with a removable top $c$ and supporting legs or feet C', as well as lateral projections $C^2$, the lower edges of which are inclined for guiding the vessel C into the vessel B. The vessel C is of such size that when it is placed with the vessel B the upper end thereof will be a slight distance below the lower horizontal set of projections $b^2$.

In practice the goods are placed in the interior vessel C, which is then placed in the vessel B, the shelf $B^3$ is now adjusted to the proper height and ice packed upon the same, after which the cover is put upon the vessel B and both vessels B and C placed within the outer vessel A. By providing the vessels B and C with feet and lateral projections airspaces are provided around said vessels, which communicate with the ice-chamber, so that a constant circulation is kept in said air-spaces, the circulation being induced by atmospheric influences upon the outer vessel.

Having thus described my invention, what I claim as new, and desire to secure by Letters Patent, is—

1. In a refrigerator shipping-case, the combination, of an outer vessel, an intermediate vessel placed therein and provided with openings in its top and bottom, lugs projecting inwardly from the sides of the intermediate vessel, and a shelf supported upon said lugs; together with an inner vessel C, the inner and intermediate vessels having feet and lateral projections, substantially as shown and for the purpose set forth.

2. In a refrigerator shipping-case, the combination, of an outer vessel A, an intermediate vessel B placed therein and provided with openings in its top and bottom, a vertical series of horizontally-disposed lugs $b^2$ extending inwardly from the sides of the vessel B near the top thereof, and a perforated shelf $B^3$ adapted to rest upon the lugs $b^2$ and be vertically adjustable thereon; together with an inner case or vessel C located within the vessel B below the shelf therein, the vessels B and C having feet and lateral projections, substantially as shown and for the purpose set forth.

3. In a refrigerator shipping-case, the combination, of an outer vessel A, an intermediate vessel B placed therein and provided with lugs $b^2$ and openings in its top and bottom, a perforated shelf $B^3$ resting upon said lugs, and an inner case or vessel C placed within the vessel B below the shelf therein; together with feet and lateral projections on the vessels B and C, the lateral projections having inclined lower edges, substantially as shown and for the purpose set forth.

In testimony whereof I affix my signature in presence of two witnesses.

FRANK WILTON MORSE.

Witnesses:
M. L. SPENCER,
A. P. BUSSEY.